United States Patent [19]

Yamagishi et al.

[11] Patent Number: 4,634,840
[45] Date of Patent: Jan. 6, 1987

[54] METHOD OF HEATING THERMOPLASTIC RESIN SHEET OR FILM

[75] Inventors: Naomichi Yamagishi; Kenji Mori; Tsuguo Okumura, all of Ibaraki; Tatsufumi Hiratsuka; Masayoshi Sugiyama, both of Tsuchiura, all of Japan

[73] Assignee: Mitsubishi Monsanto Chemical Company, Tokyo, Japan

[21] Appl. No.: 719,289

[22] Filed: Apr. 3, 1985

[51] Int. Cl.⁴ .............................................. H05B 1/02
[52] U.S. Cl. .................................. 219/388; 425/174.4; 425/DIG. 13
[58] Field of Search ................ 219/388, 412; 374/121, 374/179; 432/8, 59; 34/4, 41, 48; 425/174.4, 507, 508, DIG. 13, DIG. 108; 236/15 BC, 15 BF, 78 B

[56] References Cited

U.S. PATENT DOCUMENTS

| | | | |
|---|---|---|---|
| 1,519,287 | 12/1924 | Woodson | 219/388 |
| 2,146,427 | 2/1939 | Hawkins | 219/388 |
| 2,391,195 | 12/1945 | Ross | 219/388 |
| 2,674,809 | 4/1954 | Meinhofer | 219/388 |
| 2,952,097 | 9/1960 | Atkeson | 219/388 |
| 3,801,426 | 4/1974 | Putman | 219/388 |
| 3,956,612 | 5/1976 | Ballard | 219/388 |
| 4,188,731 | 2/1980 | Rauskolb | 219/388 |
| 4,202,112 | 5/1980 | von der Eltz | 34/4 |
| 4,306,856 | 12/1981 | Arippol | 432/8 |
| 4,486,172 | 12/1984 | Dunning | 219/388 |

Primary Examiner—E. A. Goldberg
Assistant Examiner—Teresa J. Walberg
Attorney, Agent, or Firm—Burgess, Ryan & Wayne

[57] ABSTRACT

A broad and continuous sheet or film is uniformly heated in a highly precise manner and with a specific heat profile by using a plurality of radiation heating furnaces, wherein in the interior of each radiation heating furnace, a plurality of rows of heaters are arranged rectangularly to the direction of delivery of the sheet or film to be heated. A thermometer for measuring the temperature of the sheet or film is arranged in the vicinity of an outlet for the sheet or film outside each radiation heating furnace. Outputs of heaters arranged within the radiation heating furnaces located just before the respective thermometers are controlled based on the temperatures detected by the respective thermometers by using a computer.

7 Claims, 9 Drawing Figures

FILM WIDTH

METHOD OF HEATING THERMOPLASTIC RESIN SHEET OR FILM

BACKGROUND OF THE INVENTION

1. Field of the Invention

The present invention relates to a method of heating a thermoplastic resin sheet or film. More particularly, it relates to a method of preheating, heating or heat-treating a thermoplastic resin sheet or film for obtaining a desired product by monoaxial drawing, biaxial drawing, heat setting, coating or laminating operations, in which the sheet or film is uniformly heated in a highly precise manner and with a specific temperature profile in the lateral direction of the sheet or film.

2. Description of the Prior Art

When a desired product is prepared from a thermoplastic resin sheet or film by the above-mentioned operation while preheating, heating or heat-treating the sheet or film at a predetermined temperature, an indirect heating method is adopted. A hot air heating method can be mentioned as an example of this indirect heating method. According to this hot air heating method, heated air is blown against a sheet or film to be heated. When this heating method is adopted, the temperature of the sheet or film readily becomes very close to the temperature of heated air, and therefore, the temperature can be adjusted relatively easily, the influence of the ambient temperature outside a heating furnace is small and the temperature precision is high. However, in this method, the sheet or film is likely to wave become wavy, and a partial distortion is caused in a sheet or film heated at a temperature close to the softening temperature of the resin, especially in the heated film. Namely, so-called flaring is caused, and when the product is unwound, waves are formed on the film surface and the quality of the product is degraded. Moreover, in the case where the film is very thin, breaking is caused because of this waving.

As another indirect heating method, there can be mentioned a radiation heating method in which a sheet or film is heated by irradiating the sheet or film with electromagnetic waves of infrared or far infrared ray regions. This heating method is advantageous in that (a) the heating furnace can be constructed at a low cost, (b) the maintenance of the heating furnace is easy and (c) the heating efficiency is high. However, the method is defective in that (d) the heating furnace is readily influenced by a power source voltage applied to heaters arranged in the furnace and (e) the heating temperature is readily influenced by the outer atmosphere surrounding the heating furnace, and therefore, the heating precision in the sheet or film is low.

The principle of the heat conduction in heating a sheet or film according to the radiation heating method is illustrated in the conceptual diagram of FIG. 1. Referring to FIG. 1, even if the temperature TH of a heater 12 is maintained at a constant level, when the ambient air temperature TA is changed, the temperature TF of a film 11 is influenced and changed. Accordingly, in order to maintain the film temperature TF at a constant level, it is necessary to occasionally correct the set value of the heater temperature TH.

In the case where a sheet or film is heated according to the radiation heating method, a plurality of heaters arranged in the radiation heating furnace interfere with one another. This interference state is shown in the conceptual diagram of FIG. 2, in which reference numerals 22, 23, 24 and 25 represent a heater, a heat reflecting plate, a clip and a clip rail, respectively.

Referring to FIG. 2, at a position i on a sheet or film 21 (positions located on the right side of the position i in the lateral direction on the sheet or film 21 are designated as $i+1, i+2, \ldots$, and positions located on the left side of the position i in the lateral direction on the sheet or film 21 are designated as $i-1, i-2, \ldots$), the radiation heat from a heater located at a position j just above the position i (the positions $i, i+1, i+2, i-1$ and $i-2$ on the sheet or film correspond to the heater positions $j, j+1, j+2, j-1$ and $j-2$, respectively) is largest at the position i on the sheet or film 21, but radiations from the positions $j-2, j-1, j+1$ and $j+2$ cannot be neglected. Accordingly, even if only the set value of the temperature of the heater at the position j just above the position i is changed so as to adjust the temperature at the position i on the sheet or film 21, the temperature precision throughout the lateral direction of the sheet or film is not improved.

In the case where a biaxially drawn film of a thermoplastic resin is prepared while adopting the radiation heating method, the film temperature in the central portion of the heating furnace becomes higher than the film temperature in the vicinity of the heating furnace wall. As means for adjusting the temperature in a highly precise manner as in this case, there are known (a) a method in which a plate-like shielding member having many through holes with different diameters is arranged between a heater and a film at a position where the film is readily over-heated, and (b) a method in which a plurality of nets are arranged instead of the plate-like member having holes with different diameters, used in method (a). Even if these methods (a) and (b) are adopted, delicate temperature adjustment is difficult, and it is not easy to appropriately change the position, hole diameter and number of the interposed shielding member according to the conditions. Moveover, since the interposed shielding member cuts heat waves, the heating efficiency is reduced.

SUMMARY OF THE INVENTION

In view of the above-mentioned background, it is a primary object of the present invention to provide a method of preheating, heating or heat-treating a thermoplastic resin or film for obtaining a desired product by monoaxial drawing, biaxial drawing, heat setting, coating or laminating operation, in which the sheet or film is uniformly heated in a highly precise manner with a specific heat profile.

More specifically, in accordance with the present invention, there is provided a method of continuously heating a broad and continuous thermoplastic sheet or film by using a plurality of radiation heating furnaces, wherein in the interior of each radiation heating furnace, a plurality of rows of heaters are arranged rectangularly to the travelling direction of the sheet or film to be heated, a thermometer for measuring the temperature of the sheet or film is arranged in the vicinity of an outlet for the sheet or film outside each radiation heating furnace, and outputs of heaters arranged within the radiation heating furnaces located just before the respective thermometers are controlled based on the temperatures detected by the respective thermometers by using a computer.

DETAILED DESCRIPTION OF THE PREFERRED EMBODIMENTS

In the present invention, all of theremoplastic resins that can be formed into a film or sheet are included within the scope of the themoplastic resin. For example, there can be mentioned styrenic polymer resins, vinyl chloride polymer resins, olefin polymer resins, polyamides, polyesters, polycarbonates, acrylic resins, silicon resins, fluorine resins, polyvinyl alcohol, polyvinyl butyral, polyacetal, polysulfone and polyphenylene oxide. Of course, thermoplastic resins that can be used are not limited to those exemplified above. By the sheet or film is meant a product having a thickness of 0.5 micrometer to several millimeters.

The heating method of the present invention can be applied when a thermoplastic sheet or film is monoaxially or biaxially drawn, a crystallizable sheet or film is heat-set after drawing, a coating liquid coated on a sheet or film is dried, a sheet or film is laminated with another member, or a sheet or film is formed into a molded article according to the differential pressure molding method.

The present invention will not be described in detail with reference to the embodiments shown in the accompanying drawings, though the scope of the invention is not limited by these embodiments.

The heating method of the present invention is utilized for heating a broad and continuous thermoplastic resin sheet or film. A plurality of radiation heating furnaces are used for heating the sheet or film in the method of the present invention. The reason why a plurality of radiation heating furnaces are used in combination is that gradual heating is advantageously effected.

Figure 3:
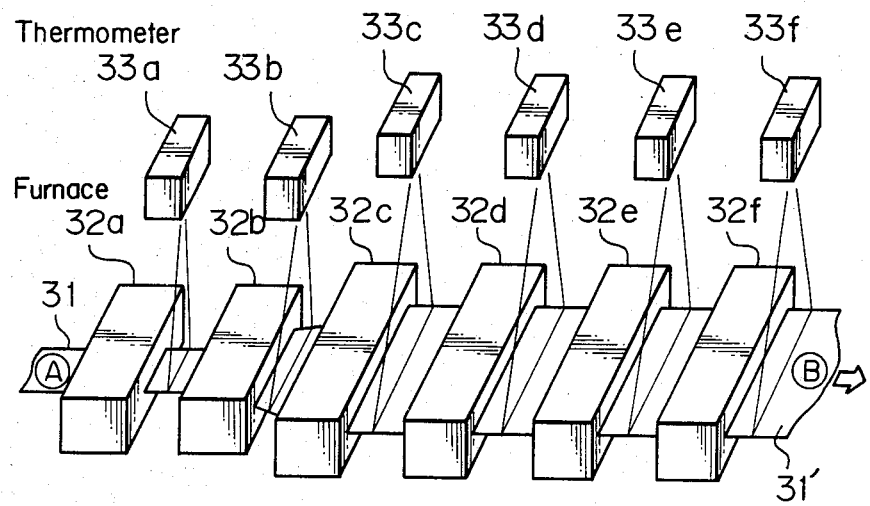
FIG. 3 is a perspective diagram showing an example of the state where a thermoplastic resin sheet or film is heated according to the method of the present invention.

It is preferred that a plurality of radiation heating furnaces be arranged at appropriate intervals in a passage for travelling of a sheet or film 31 to be heated, as shown in FIG. 3. FIG. 3 illustrates an embodiment in which the heating method of the present invention is applied to the step of biaxially drawing the sheet or film 31. It is preferred that the sheet or film 31 be passed through central portions of respective radiation heating furnaces 32a through 32f, as shown in FIG. 3.

Figure 4:
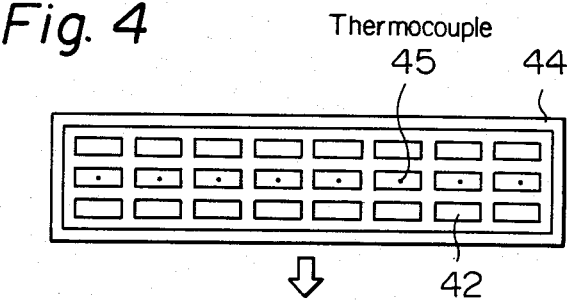
FIGS. 4 and 5 are plane views showing examples of the arrangement of heaters in a radiation heating furnace.
Figure 5:
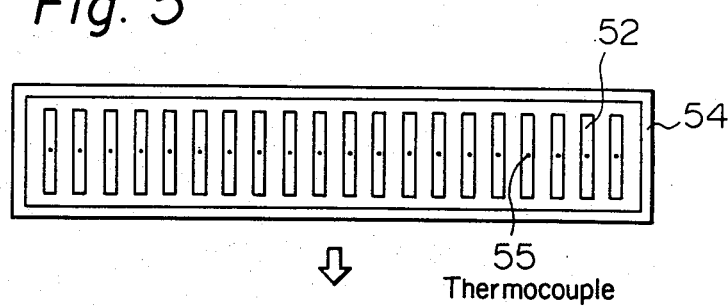

Each of the radiation heating furnaces 32a through 32f is constructed so that a plurality of heaters are arranged on the upper side and/or the lower side of the sheet or film passing through the furnace. It is preferred that a plurality of heaters be arranged in one row or a plurality of rows rectangularly to the travelling direction (indicated by an arrow in the drawings) of the sheet or film. In FIG. 3, each of reference numerals 33a through 33f represents a thermometer. When the length of the heater is short, there may be adopted an arrangement method in which, as shown in FIG. 4, a plurality of rows, each row including a plurality of heaters 42 arranged rectangularly to the travelling direction of the sheet or film, are combined. If the length of the heater is long, there may preferably be adopted an arrangement method in which, as shown in FIG. 5, a plurality of heaters 52 are arranged in parallel to the travelling direction (indicated by an arrow) of the sheet or film to form one row of the heaters extending rectangularly to the travelling direction of the sheet or film as a whole. In FIGS. 4 and 5, reference numerals 45 and 55 represent a themocouple and reference numerals 44 and 54 represent a wall of the heating furnace.

When heaters are arranged on both the sides of the sheet or film, the directions of the rows may be the same in both the sides, or they may intersect each other. Heaters arranged on one side may be laid out according to the method shown in FIG. 4 or 5 or while adopting the methods shown in FIGS. 4 and 5 in combination.

When heaters are arranged only on the upper or lower side of the sheet or film to be heated, it is preferred that heat wave reflecting plates be arranged on the side where heaters are not arranged. As the heat wave reflecting plate, there can be mentioned an aluminum thin plate and a metal plate vacuum-deposited with gold, silver or aluminum.

A heat generating member capable of generating heat waves of the infrared or far infrared region may be used as the heater. For example, there can be mentioned an infrared lamp, an infrared heater and a far infrared heater. Of course, heaters that can be used in the present invention are not limited to these heater. In order to irradiate the sheet or film with heat waves of the heater at a high efficiency, it is preferred that a heat wave reflector be used in combination with the heater.

In order to increase the heating efficiency of the radiation heating furnace, the furnace wall is preferably made of a metallic material and the inner wall is preferably mirror-polished or covered, with an aluminum foil or the like to reflect heat waves. Moreover, in order to prevent dissipation of heat from the surface of the furnace wall, the outer side of the furnace wall is preferably covered with a heat insulator material.

At least one temperature sensor is disposed for one row of heaters arranged rectangularly to the travelling direction of the sheet or film to be heated. The temperature sensor is arranged in the vicinity of the heater surface to measure the temperature of the position where the sensor is arranged. The measured value of the temperature is compared with a set heater temperature value in a computer and is utilized for adjusting the output (voltage or current intensity) of the heater. In the heater arrangement shown in FIG. 4, at least one temperature sensor may be disposed for the eight heaters 42 of the central row. For example, a temperature sensor may be disposed for every alternate heater, for every third heater or for each of the eight heaters. The sensors may similarly be disposed for heaters 52 shown in FIG. 5. As the temperature sensor, there can be mentioned, for example, a thermocouple and a platinum resistor.

In the present invention, with respect to each of a plurality of radiation heating furnaces, a thermometer for measuring the temperature of the sheet or film is arranged in the vicinity of an outlet for the sheet or film outside the heating furnace, and the outputs of the heaters in the radiation heating furnace arranged just before the thermometer are controlled based on the temperature detected by the thermometer by using the computer.

Figure 6:
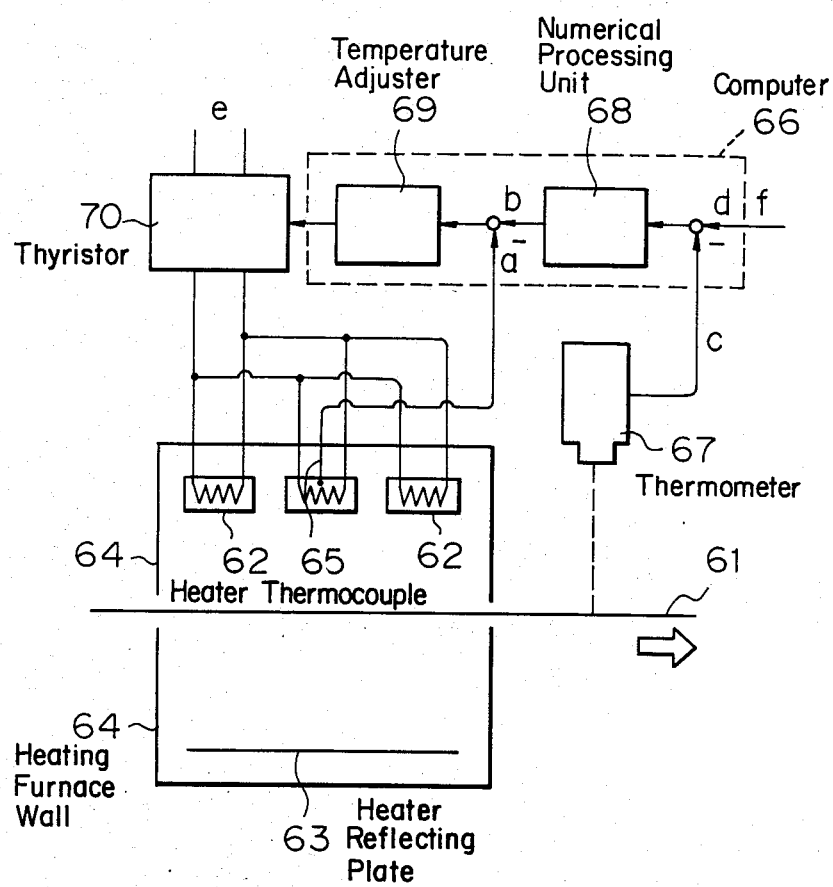
FIG. 6 is a diagram illustrating a temperature control mechanism.

The thermometer 67 is disposed to measure the temperature of the sheet or film 61, and the measured value c is compared with a set temperature value d of the sheet or film 61 in the computer 66 and utilized for adjusting the output (voltage or current intensity) of the heater 62. In FIG. 6, symbol e represents a power source, and reference numerals 63, 64, 65 and 70 represent a heat reflecting plate, a heating furnace wall, a thermocouple and a thyristor, respectively.

The thermometer is disposed in the vicinity of the outlet for the sheet or film outside the radiation heating furnace. The reason why the thermometer is located outside the radiation heating furnace is that the thermometer is not influenced by the radiation heating furnace (heat waves from the heaters and heat waves reflected within the furnace). The distance between the position of the thermometer and the outlet of the radiation heating furnace for the sheet or film is preferably determined depending on the structural features of the radiation heating furnace, especially a clearance formed between the upper and lower walls of the heating furnace for travelling of the sheet or film and the travelling speed of the sheet or film, and this clearance may be selected within the range of from 3 cm to 20 cm. The thermometer may be located on either the upper or lower side of the sheet or film.

It is preferred that the temperature on the sheet or film be measured at a plurality of points in the lateral direction of the sheet or film. Especially in case of a broad sheet or film or in order to produce a specific temperature profile in the lateral direction of the sheet or film, it is preferred that the measurement be made at many points.

As the thermometer, there can be used, for example, an infrared thermometer and a radiation thermometer. At least two thermometers may be arranged at one point (one linear place for the measurement in a lateral direction, i.e., a direction rectangular to the travelling direction of the sheet or film). The thermometer may be a spot type (point measurement) thermometer provided with an oscillating mechanism, a scanning type (line measurement) thermometer or infrared ray sensors arranged in a line (linear ray).

From the results of experiments made by us, it has been found that when a thermoplastic resin sheet or film is heated, good results are obtained if the adjustment is carried out according to the following formula (I):

$$T'Hj = THj + \begin{pmatrix} \text{coefficient matrix of} \\ m \times n \end{pmatrix} \cdot \{TFi - TFxi\} \quad (I)$$

wherein T'Hj represents a new set value of the heater temperature at the position j, THj represents an original set value of the heater temperature at the position j, TFi represents an original set value of the sheet or film temperature at the position i, TFxi represents a measured value of the sheet or film temperature at the position i, j represents the position of the heater in a heater row in the radiation heating furnace and j means number of 1 through m, i represents the position on the sheet or film in the lateral direction and i means number of 1 through n, and (coefficient matrix of m×n) is a constant determined by the thermal characteristics of the used radiation heating furnace.

TFxi in the formula (I) is measured by the thermometer 67 for measuring the temperature of the sheet or film (the measured value is designated as c). The difference of TFxi from the set value TFi of the sheet or film determined in advance by calculations and experiments is computed by a numerical processing unit 68 in the computer 66. This difference is designated as the sheet or film temperature deviation. A set value b of the heater temperature for the sheet or film, heater 62 is determined according to this deviation. This set value b and the measured value a of the heater temperature are fed to a heater temperature adjusting device 69. In the heater temperature adjusting device 69, the measured value a of the heater temperature is compared with the set value b of the heater temperature, and in case of a<b, the output (voltage or current intensity) of the heater is changed so that the measured value a of the heater temperature is elevated. On the other hand, in case of a>b, the output of the heater is changed so that the measured value a of the heater temperature is lowered.

THj, TFi and TFxi in the formula (I) can be determined by carrying out calculations and measurements in the width direction of the sheet or film. T'Hj is computed by the numerical processing unit 68 in the computer 66. A microcomputer, a personal computer or a minicomputer may be used as the computer 66. The heater temperature adjusting device 69 is disposed to adjust and control the output of the heater 62. An ordinary adjusting controller such as a controller, a DDC controller or a multi-loop controller may be used for the adjustment, and the control may be accomplished according to the on-off control method, the P control method (proportional feedback control method giving an action quantity in proportion to the deviation), the PI control method [combination of the P control method and the I control method (integrated action feedback control method giving an integrated value of the deviation as an action quantity)] or the PID control method [combination of the PI control method and the D control method (differential action feedback control method giving a differential value of the deviation as an action quantity)].

The value of (coefficient matrix of m×n) in the formula (I) can be determined by repeating numerical operations (simulations) and/or experiments with respect to the used radiation heating furnace. Incidentally, m represents the number of heaters arranged in one row in the direction perpendicular to the delivery direction of the sheet or film and n represents the number of sheet or film temperature measuring points arranged in one row in the direction rectangular to the delivery direction of the sheet or film.

Procedures of determining (coefficient matrix of m×n) will now be described.

(1) A numerical operation is performed to approximately determine matrix elements.

(2) Numerical values are changed while passing the sheet or film through the radiation heating furnace, so that optimum control will be performed.

The numerical operation is carried out in the following manner.

Figure 1:
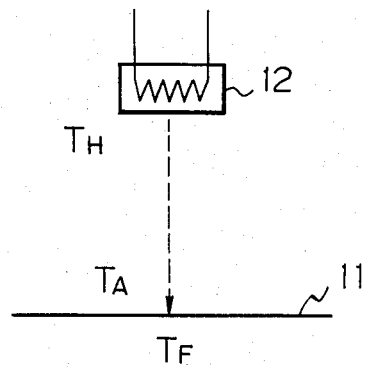
FIG. 1 is a conceptual diagram illustrating the principle of radiation heating.
Figure 2:
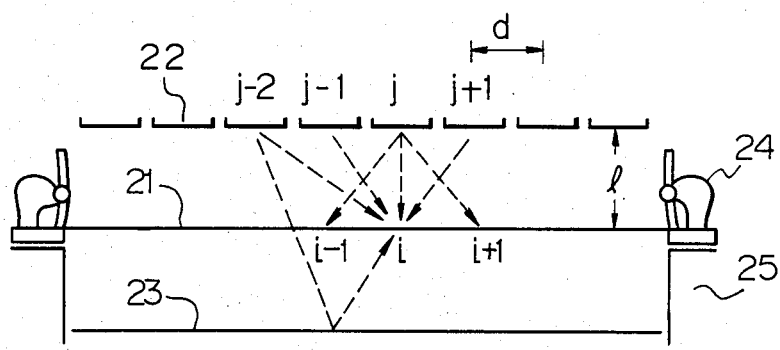
FIG. 2 is a conceptual diagram illustrating the interferential state of a plurality of heaters in a radiation heating furnace.

One to m of heaters are arranged in one row perpendicular to the travelling direction of the sheet or film, and the temperatures on the sheet or film are measured at one to n of points just below the heaters. Supposing that the distance between adjacent heaters is d and the distance between the heater and the sheet or film is l (see FIG. 2), the radiation energy Qij transmitted from the heater at the position j to the position i on the sheet or film is represented by the following formula (II):

$$Qij = \delta(Tj^4 - Ti^4) \frac{\cos^2\theta}{\pi\{[dx(i-j)]^2 + l^2\}} \quad (II)$$

wherein Tj represents the heater temperature, Ti represents the temperature of the sheet or film, $\theta$ represents the angle formed when the radiation heat emitted from the heater at the position j reaches the position i on the sheet or film and $\sigma$ is the Boltzmann's constant based on the supposition that both the heater and the sheet or film are black.

Of the above formula, the fraction varying according to the positional relationship between i and j is expressed by the following formula (III):

$$Kij = \frac{\cos^2\theta}{\{[dx(i-j)]^2 + l^2\}} \frac{l^2}{\{[dx(i-j)]^2 + l^2\}^2} \quad (III)$$

Kij is called "a configuration coefficient" and is the matrix of n×m where n is from 1 to n and j is from 1 to m. This indicates the degree of the influence of the heater at the position j on the sheet or film temperature at the position i. In a state very close to the temperature equilibrium, the minute change ΔTFi of the sheet or film temperature can be approximated to the minute change ΔTHi of the heater temperature by using Kij according to the following formula (IV):

$$\Delta TFi \approx C[Kij] \cdot \Delta THj \quad (IV)$$

wherein C is a constant.

The inverse matrix of Kij is expressed by the following formula (V):

$$\Delta THj = C'[Kij]^{-1} \cdot \Delta TFi \quad (V)$$

wherein C' is a constant.

[Kij]$^{-1}$ in the formula (V) is in agreement with (coefficient matrix of m×n) in the above-mentioned formula (I). [Kij] and [Kij]$^{-1}$ are calculated by substituting the actual values of j, i, d and l in the above-mentioned formula (III). When the calculated value is a real number having a decimal part, for convenience of calculation, it is preferred that the value be changed to an integral number by cutting the decimal part and this integral value be used for the calculation.

In the case where the coefficient matrix obtained by the above-mentioned numerical operation is stored in the computer and the temperature adjusting and controlling test is actually carried out by passing a sheet or film through the radiation heating furnace, sometimes, if the measured value c of the sheet of film temperature is not in agreement with the set value b of the sheet or film temperature, the set temperature b of the heater is not changed. This disadvantage will be obviated by repeating the experiment while slightly correcting the numerical value of the coefficient matrix of m×n, so that a preferred coefficient matrix of m×n is obtained.

Since the following prominent effects are attained by the present invention, the present invention is industrially valuable.

(1) In the case where a thermoplastic resin sheet or film is heated by a radiation heating furnace having a plurality of heaters arranged therein according to the conventional technique, because of interference among the heaters, it is difficult to uniformly adjust and control the temperature of the sheet of film in a highly precise manner, but according to the method of the present invention, this interference among the heaters can be moderated and the temperature of the sheet or film can be uniformly adjusted and controlled in a highly precise way with a specific temperature profile.

(2) In the case where a thermoplastic resin sheet or film is heated by a radiation heating furnace having a plurality of heaters arranged therein according to the conventional technique, since the temperature of the sheet or film is greatly influenced by air outside and inside the furnace, it is difficult to uniformly adjust and control the temperature of the sheet or film in a highly precise manner. In contrast, according to the present invention, the temperatures outside and inside the furnace are promptly detected by a temperature sensor for the heater and a thermometer for measuring the temperature of the sheet or film and are fed back to a heater temperature adjusting device to effect the adjustment and control of the temperature, and therefore, the influence of air outside and inside the furnace can be greatly reduced.

(3) According to the method of the present invention, even when a thermoplastic sheet or film to be heated is supplied at a high speed, the sheet or film can be easily heated stepwise to a desired level by using a plurality of radiation heating furnaces.

(4) According to the method of the present invention, since there is not disposed a shielding member adopted for the temperature control in a conventional radiation heating furnace, the heating efficiency can be increased and delicate temperature control can be performed.

The present invention will now be described in detail with reference to the following example that by no means limits the scope of the invention.

EXAMPLE

This example illustrates an embodiment in which the method of the present invention is applied to drawing and heat setting of a polyamide film.

A polyamide (Novamid 1020J supplied by Mitsubishi Chem. Ind. Ltd.) was melted by an extruder and formed into a sheet through a die and a casting roll. The sheet was longitudinally drawn by a group of longitudinally drawing rolls.

The longitudinally drawn film was delivered from the point Ⓐ the direction of an arrow in FIG. 3 and passed through six radiation heating furnaces 32a through 32f to effect preheating, drawing and heat setting. At the point Ⓐ in FIG. 3, the film 31 had a width of 600 mm and a of 50 micrometers.

Of the six radiation heating furnaces, the first heating furnace 32a was used for preheating the film, the second and third heating furnaces 32b and 32c were used for heating at the drawing step, and the fourth, fifth and sixth heating furnaces 32d, 32e and 32f were used for heat-setting the drawn film.

In each heating furnace, far infrared heaters having a length of 150 cm (Radiant Heaters 200 V-2 KW supplied by Ishihara Heater K.K.) were arranged at intervals of 10 cm only on the upper side of the film, as shown in FIG. 5, and an aluminum foil-bonded iron plate was arranged as a heat wave reflecting plate on the lower side of the film. A thermocouple was arranged to be in contact with each far infrared heater, so that all of the twenty heaters independently performed automatic temperature adjustment. A multi-loop controller (Model REX-Z2000 supplied by Rika Kogyo K.K.) was used for the temperature adjustment, and the PID control method was adopted for the temperature control.

On the film outlet sides of the respective radiation heating furnaces, there were disposed radiation thermometers 33a through 33f (Pyroscanners supplied by Chino Seisakusho K.K.) at positions 2 m above the film surface, and the temperature in the vicinity of the outlet of each heating furnace was measured. The film temperature was measured every one second at points spaced from each other at intervals of 10 cm in the width direction of the film, and the measured values were fed into a computer. The interval between every two adjacent radiation heating furnaces, the distance between the furnace outlet and the point for the measurement of the film temperature and the set temperature value at each point are shown in Table 1.

Every five minutes, the numerical operation was carried out according to the following calculation formula (I) and automatic temperature adjustment and control were carried out while correcting the set values of the heater temperature:

$$T'Hj = THj + \begin{pmatrix} \text{coefficient matrix of} \\ m \times n \end{pmatrix} \{TFi - TFxi\} \quad (1)$$

$$i = 1 \sim 20$$
$$j = 1 \sim 20$$

In the above formula (I), an intergral value of (coefficient matrix of m×n), which was obtained according to the procedures described in detail hereinbefore and determined in view of the experimental results, is as shown below:

$$\begin{bmatrix}
3 & -1 & 1 & 0 & . & . & . & . & . & . & . & . & 0 \\
-1 & 4 & -2 & 2 & 0 & . & . & . & . & . & . & . & \\
1 & -2 & 5 & -3 & 2 & 0 & . & . & . & . & . & . & \\
0 & 2 & -3 & 5 & -3 & 2 & 0 & . & . & . & . & . & \\
 & 0 & 2 & -3 & 5 & -3 & 2 & 0 & . & . & . & . & \\
 &  & 0 & 2 & -3 & 5 & -3 & 2 & 0 & . & . & . & \\
 & . & . & . & . & . & -3 & 2 & & & & & \\
 & . & . & . & . & -3 & 5 & -3 & 2 & & & & \\
 & . & . & . & 2 & -3 & 5 & -2 & 1 & & & & \\
 & . & . & . & . & 2 & -2 & 4 & -1 & & & & \\
0 & . & . & . & . & . & . & 1 & -1 & 3 & & &
\end{bmatrix}$$

The result obtained by performing automatic temperature adjustment and control while making the calculation according to the above formula (I) is shown as the precision (the difference between the set value and the measured value) in Table 1.

Figure 7A:
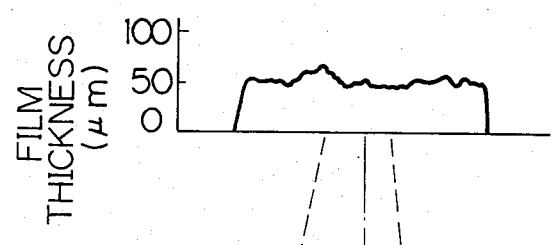
FIGS. 7A to 7C show thickness and set temperature profiles in heating a film according to the method of the present invention.
Figure 7B:
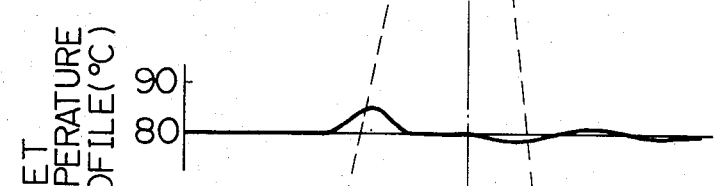
Figure 7C:
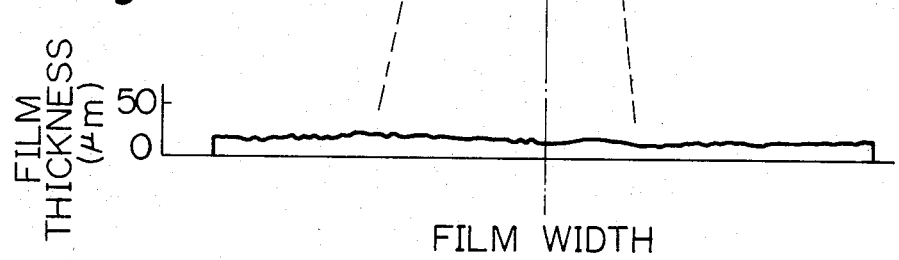

. A specific profile in the lateral direction of the sheet or film shown in FIG. 7B was given to the film temperature according to the thickness distribution of the film at the point (A) in FIG. 3 (see FIG. 7A). The finally obtained film had a width of 2000 mm and a thickness of 15 micrometer. The thickness distribution of the film 31' at the point (B) in FIG. 3 was as shown in FIG. 7C.

TABLE 1

| Furnace No. | Function of furnace | Furnace distance (cm) | Film temperature measurement position (cm) | Set film temperature (°C.) | Precision (°C.) |
| --- | --- | --- | --- | --- | --- |
| 1 | Preheating | 20 | 6 | 70 | ±0.5 |
| 2 | Drawing | | 3 | 80 | ±0.5 |
| 3 | Drawing | 6 | 6 | 85 | ±0.5 |
| 4 | Heat setting | 20 | 6 | 150 | ±1.0 |
| 5 | Heat setting | 20 | 6 | 180 | ±1.0 |
| 6 | Heat setting | 20 | 6 | 190 | ±1.0 |

We claim:
1. A method of continuously heating a broad and continuous thermoplastic film by using a plurality of radiation heating furnaces, wherein in the interior of each radiation heating furnace, at least one row of heaters are arranged perpendicularly to the travelling direction of the film to be heated, a thermometer for measuring the temperature of the film is arranged in the vicinity of an outlet for the film outside each radiation heating furnace, and outputs of heaters arranged within the radiation heating furnaces located just before the respective thermometers are controlled based on the temperatures detected by the respective thermometers by using a computer.

2. A method according to claim 1 wherein each of the radiation heating furnace has at least one row of heaters arranged on both the upper and lower sides of the film.

3. A method according to claim 1 wherein each of the radiation heating furnace has at least one row of heaters arranged on one of the upper and lower sides of the film, and a plurality of heat wave reflecting plates arranged on the side where the heaters are not arranged.

4. A method according to claim 1 wherein at least one of said row of heaters in each radiation heating furnace has a temperature sensor.

5. A method according to claim 1 wherein at least one of the heaters in at least one row of the heaters in each radiation heating furnace has a temperature sensor.

6. A method according to claim 1 wherein the temperature of the film is measured at a plurality of points in the lateral direction of the film.

7. A heating method according to claim 1, wherein the film is heated while making an adjustment according to the formula (I):

$$T'Hj = THj + \begin{pmatrix} \text{coefficient matrix of} \\ m \times n \end{pmatrix} \cdot \{TFi - TFxi\} \quad (I)$$

wherein T'Hj represents a new set value of the heater temperature at the position j, THj represents an original set value of the heater temperature at the position j, TFi represents an original set value of the film temperature at the position i, TFxi represents a measured value of the film temperature at the position i, j represents the position of the heater in a heater row in the radiation heating furnace and j means number of 1 through m, i represents the position on the film in the lateral direction and i means number of 1 through n, and (coefficient matrix of m×n) is a constant determined by the thermal characteristics of the used radiation heating furnace.

* * * * *